United States Patent [19]

Cassella et al.

[11] 4,200,527

[45] Apr. 29, 1980

[54] TREATING CHROME TANNING BATH RECYCLE STREAM

[75] Inventors: Vincent J. Cassella, Crystal Lake, Ill.; Mazin R. Irani, Norristown, Pa.

[73] Assignee: PQ Corporation, Valley Forge, Pa.

[21] Appl. No.: 953,245

[22] Filed: Oct. 20, 1978

Related U.S. Application Data

[63] Continuation-in-part of Ser. No. 891,233, Mar. 29, 1978, abandoned.

[51] Int. Cl.² ............................ C02B 1/20; C02C 3/06
[52] U.S. Cl. ......................................... 210/49; 210/51; 210/60; 210/DIG. 30; 8/94.27
[58] Field of Search ............ 8/94.27; 210/38 B, 42 R, 210/45, 47, 49, 51, 59, 60, DIG. 30

[56] References Cited

U.S. PATENT DOCUMENTS

| | | | |
|---|---|---|---|
| 3,766,036 | 10/1973 | McKaveney | 210/42 R |
| 3,950,131 | 4/1976 | Young | 8/94.27 |
| 4,012,320 | 3/1977 | Conner et al. | 210/45 |

FOREIGN PATENT DOCUMENTS

| | | | |
|---|---|---|---|
| 46-23491 | 7/1971 | Japan | 210/DIG. 30 |
| 50-8265 | 4/1975 | Japan | 210/DIG. 30 |
| 51-1362 | 1/1976 | Japan | 210/10 |
| 52-10097 | 3/1977 | Japan | 210/DIG. 30 |

*Primary Examiner*—Thomas G. Wyse
*Attorney, Agent, or Firm*—E. G. Posner; J. S. Bobb; F. C. Philpitt

[57] ABSTRACT

The recycle stream from chrome tanning baths can be treated with magnesium silicate to reduce the amount of suspended solids. The treated stream can be recycled more times, thereby providing a considerable savings of chrome values.

14 Claims, No Drawings

TREATING CHROME TANNING BATH RECYCLE STREAM

This application is a continuation-in-part of our co-pending application Ser. No. 891,233 filed Mar. 29, 1978, now abandoned.

BACKGROUND OF THE INVENTION

This invention generally relates to treatment of largely aqueous solutions at acid pH values to remove suspended solids. In particular, this invention involves treating the recycle stream of a chrome tanning bath with magnesium silicate to promote removal of suspended solids while minimizing loss of chrome values.

Hides of various animals are treated mechanically and chemically to produce leather. The most common method of tanning is chrome tanning wherein the hides, after a number of preparatory steps, are placed in a bath containing chromium salts such as chromium (III) chloride or chrominum (III) sulfate. In the bath, the hides absorb the chromium (III) ions which render the hide into leather.

The exhausted tanning bath contains significant chrome values along with fats, oils and suspended solids. The chrome values can be partially recovered by a recycling system of several steps. The oil and fat may be removed mechanically by skimming. Then, lime and a flocculating agent added to flocculate the chrome and other suspended solids. The supernatant from this step is discarded. The flocculated solids containing the chrome are acidified to redissolve the chrome value; unfortunately, the other flocculated solids also become redispersed. Then additional chromium salt is added and the bath is ready for use. As the bath is recycled, the suspended solids build up and after a number of these cycles, the spent bath must be discarded with the consequent substantial loss of expensive chrome values.

Numerous flocculating agents of the type used in water treatment have been used in an attempt to remove suspended solids from the recycle stream without removing the chrome value. Unfortunately, these agents do not function well in the acid environment of the chrome tanning bath.

It is an object of this invention to remove suspended solids from tannery chrome recycle streams without substantially reducing the concentration of the chrome value in that stream. It is a further object of this invention to extend the number of recycles of the chrome bath before it must be discarded, thereby saving considerable chrome values and money.

In preparing this application, the fields of tanning, waste water treatment, flocculants and magnesium silicate were considered and searched. No relevant references were found thereby no prior art references were considered when drafting this application.

SUMMARY OF THE INVENTION

We have found that addition of magnesium silicate to chrome recycle streams at pH values of less than about 4.5 effectively flocculates suspended solids without removing substantial amounts of chrome values. Treatment in this manner can extend the number of recycles before the chrome bath must be discarded.

THE INVENTION

The chrome recycle streams that are successfully treated by the process of our invention contain chromium ions equivalent to 5 to 15 g/liter of $Cr_2O_3$ and have pH values between 2 and 4.5. The suspended solids are less than about 7% and usually about 0.1 to 4.5%.

An amorphous, hydrated, highly porous magnesium silicate is required for the process of our invention. Such material can be prepared by the interaction of soluble magnesium salts with alkali metal silicate or by the interaction of magnesium hydroxide, an acid and alkali metal silicate. Other methods of preparation may lead to useful materials if they have the required composition and properties which are summarized in Table I.

TABLE I

| Properties of Useful Magnesium Silicates | |
|---|---|
| Mole Ratio ($SiO_2$/MgO) | 1.75 to 4.50 |
| Average Particle Size (microns) | 10 to 50 |
| Surface Area ($m^2$/g) | 30 |
| Bulk Density, tamped (g/cc) | 0.40 to 0.75 |
| Weight Loss at 105° C. (wt. %) | 5 to 15 |
| Ignition Loss (wt. %) | 10 to 30 |

We prefer the magnesium silicate to have a surface area between 35 and 65 $m^2$/g and 325 $SiO_2$ per mole of MqO. The useful silicate is white, free-flowing, insoluble in water and easily filtered from or easily settles in aqueous suspensions.

The exhausted chrome bath is skimmed and magnesium silicate is added to the stirring effluent. Sufficient silicate must be used to flocculate the solids usually 0.1 to prefer to use 0.15 to 0.30% of the silicate. A floc forms as the magnesium silicate becomes mixed with the effluent. Mixing is continued until structured floc forms, about 10 to 20 minutes or more. This floc settles upon stopping the agitation and a reduction of more than half the suspended solid is realized. Additional increments of the magnesium silicate do not appear to substantially increase the amount of suspended solids removed. Little or no chromium ion is complexed by the magnesium silicate when the pH is adjusted to and matainted below 4.5.

The removal of a substantial amount of suspended solids from the recyle bath prior to acidification allows recycle of this chrome containing material for more cycles than for the usual process. In most cases, the use of magnesium silicate allows at least twice as many recycles as the usual liming process. In this process, the volume of the recovered supernatant is as important as the reduction in suspended solids since it contains the reusable chrome value. This aspect of the recycle process also favors the use of magnesium silicate at pH values below about 4.5 since its use does return more supernatant to the tanning bath. Less liquid and chromium ions remain in the settled sludge.

These two aspects of the recycle process can be combined to calculate an Efficiency Factor Ratio (EFR).

$$EFR = S_a \times R_a / (S_n \times R_n)$$

$S_a$ = % of the process stream recovered as supernatant using additive A;
$R_a$ = % of solids removed using additive A;
$S_n$ = % of the process stream recovered as supernatant using no additive;
$R_n$ = % of solids removed using no additive.

The EFR was used to compare the performance of magnesium silicate according to our invention with other flocculating agents. This data is presented in the Examples and shows the superior performance of magnesium silicate.

The hydrated magnesium silicate is also useful in reducing the suspended solids in other acidic systems whether they contain metallic ions or not. Of course, this process is most useful in acid systems containing metal ions which should not be adsorbed and thereby removed from the supernatant, such as those of the electroplating industry.

EXAMPLES

The following Examples are illustrative of certain embodiments of the invention, and are not considered to express the scope of our invention. The limitations and scope of the invention are fully described and defined in the specification and the claims. The proportions are in weight percent (%) and parts per million (ppm), unless otherwise stated.

EXAMPLE 1

A chrome bath recycle stream with a pH of 3.6 containing 5000 ppm of chromium as $Cr_2O_3$ and 0.13% suspended solids was treated with 0.25% magnesium silicate. The magnesium silicate had a mole ratio of $SiO_2$ to $MgO$ of 2.5, an average particle size of 30μ, a surface area of 50 m²/g and a bulk density of 0.56 g/cc, a weight loss at 105° C. of 12% and an ignition loss of 23%. Mixing was stopped after 10 minutes and the floc settled in about 30 minutes. The supernatant which contained the chrome values was recovered and contained 4,950 ppm $Cr_2O_3$ and 0.06% suspended solids.

This chrome bath recycle stream was also treated with 0.25% of magnesium silicate having 3.7 moles of $SiO_2$ per mole of $MqO$ at the same conditions. The supernatant contained 4,900 ppm of $Cr_2O_3$ and 0.07% suspended solids.

EXAMPLE 2

The process described in Example 1 was repeated 10 times after 10 chrome tanning cycles. After the 10 cycles, the exhausted chrome bath was discarded. Using the usual recycle system, the chrome bath would be discarded after 5 cycles.

EXAMPLE 3

A chrome bath recycle stream of 36,300 pbw was treated with 100 pbw of magnesium silicate with the same properties as that described in Example 1. The treatment level was 0.275%. The silicate was added in 10 minutes with stirring. The mixture was then stirred for 20 additional minutes. Samples of the supernatant were taken after 50 and 90 minutes of settling. The composition of the untreated and treated materials is summarized in the following Table II.

TABLE II

|  | Untreated | Treated 50 Minutes Settling | Treated 90 Minutes Settling |
|---|---|---|---|
| pH | 3.49 | 3.72 | 3.71 |
| Total Solids(%) | 10.49 | 9.71 | 8.77 |
| Suspended Solids(%) | 1.80 | 0.83 | 0.25 |
| Dissolved Solids(%) | 8.69 | 8.88 | 8.52 |
| $Cr_2O_3$ (gm/l) | 8.08 | 8.24 | 8.22 |
| $Cr^{+3}$ (%) | 0.51 | 0.52 | 0.52 |

These results demonstrate the dramatic removal of suspended solids while retaining the chrome value when magnesium silicate is used according to the process of our invention. The relatively long settling time can be ameloriated by filtering or centrifuging.

EXAMPLE 4

The manner in which magnesium silicate is used through a number of process cycles is illustrated in the following Table III.

TABLE III

| | Untreated Recycle Stream | | Recycle Stream Treated With 0.25% Magnesium Silicate | |
|---|---|---|---|---|
| Cycle | Suspended Solids(%) | $Cr_2O_3$ (g/l) | Suspended Solids(%) | $Cr_2O_3$ (g/l) |
| 1 | 1.80 | 8.08 | 0.25 | 8.22 |
| 2 | 1.95 | 8.11 | 0.37 | 8.18 |
| 3 | 2.21 | 8.13 | 0.49 | 8.11 |
| 4 | 2.37 | 8.06 | 0.63 | 8.03 |
| 5 | 2.58 | 8.12 | 0.75 | 8.07 |
| 6 | 2.82 | 8.03 | 0.86 | 8.00 |
| 7 | 2.93 | 8.18 | 0.92 | 8.15 |
| 8 | 3.02 | 8.12 | 0.98 | 8.15 |
| 9 | 2.11 | 8.09 | 1.05 | 8.10 |

At this point, the suspended solids in the treated recycle stream are sufficiently high so that processing difficulties might be encountered and the entire recycle stream is discarded.

EXAMPLE 5

The results disclosed in this Example illustrate the superior performance of magnesium silicate used according to our invention when campared to other flocculating agents. The comparative materials were:

MAGNIFLOC® 573C—a cationic polymeric flocculating agent;

MAGNIFLOC® 836A—an amionic polymeric flocculating agent;

MAGNIFLOC® 985N—a nonionic polymeric flocculating agent;

MAGNIFLOC® is a registered trademark of American Cyanamid.

The samples of the chrome recycle stream were thoroughly mixed and the flocculating agent added with stirring. The concentration of suspended solids was 1.5%. The agents were added at dosages recommended by the manufacturer. Stirring was continued for 30 minutes. The treated samples were placed in a graduated cylinder and the volume of supernatant noted after 90 minuted. The supernatant was also analyzed for suspended solids content. The results and the EFR calculated therefrom are summarized in the following Table IV.

TABLE IV

| | Concentration | Suspended Solids(%) | % Volume Recovered | EFR |
|---|---|---|---|---|
| None | — | 0.284 | 60 | 1.00 |
| Magnesium Silicate | 0.25% | 0.186 | 70 | 1.26 |
| MAGNIFLOC® 573C | 10 ppm | 0.296 | 65 | 1.07 |
| MAGNIFLOC® 836A | 2 ppm | 0.218 | 67 | 1.18 |
| MAGNIFLOC® 985N | 0.25% | 0.248 | 66 | 1.13 |
| Alum | 0.25% | 0.255 | 64 | 1.09 |

A second chrome recycle stream was treated in the same way and EFR's were calculated:

TABLE V

| Additive | EFR |
|---|---|
| None | 1.00 |
| 0.25% Magnesium Silicate | 5.08 |
| 10 ppm MAGNIFLOC ® 573C | 1.26 |
| 2 ppm MAGNIFLOC ® 836A | 1.87 |
| 5 ppm MAGNIFLOC ® 985N | 1.48 |
| 0.25% Alum | — |

We claim:

1. A method for removing suspended solids from an exhausted chrome tanning bath while retaining chrome values, comprising the steps of:
    (a) agitating an aqueous solution containing chromium ions, suspended solids and a pH of 2 to 4.5;
    (b) adding sufficient hydrated amorphous magnesium silicate to said agitating solution to flocculate said suspended solids;
    (c) continuing said mixing for a period of time sufficient for flocculants to form;
    (d) separating said flocculated solids from the supernatant; and
    (e) recovering the supernatant containing the chromium (III) ions.

2. The method of claim 1 wherein the aqueous solution contains about 5 to 15 g/l of chromium (III) ions calculated as $Cr_2O_3$ and about 0.1 to 4.5% by weight of suspended solids.

3. The method of claim 1 wherein 0.1 to 0.35% by weight, based on the aqueous solution of magnesium silicate, said silicate being amorphous, having a mole ratio ($SiO_2/MgO$) of 1.75/1.0 to 4.50/1.0, an average particle size of 10 to 50 microns, a surface area of 35 to 65 m$^2$/g, a bulk density of 0.40 to 0.75 g/cc, a weight loss at 105° C. of 5 to 15% and an ignition loss of 10 to 30%.

4. The method of claim 3 wherein the mole ratio ($SiO_2/MqO$) is 1.75/1.0 to 3.25/1.0.

5. The process of claim 1 wherein the mixing is continued for up to 20 minutes after the magnesium silicate is added.

6. The method of claim 1 wherein the separating step is carried out by allowing the flocculated solids to settle.

7. The method of claim 1 wherein the separation step is accomplished by filtering.

8. The method of claim 1 wherein the separation step is accomplished by centrifuging.

9. A method for removing suspended solids from an exhausted chrome tanning bath while retaining chrome values, comprising the steps of:
    (a) agitating an aqueous solution containing 5 to 15% g/l of chromium (III) ions calculated as $Cr_2O_3$ and about 0.1 to 4.5% by weight of suspended solids and having a pH between 2.0 and 4.5;
    (b) adding 0.1 to 0.35% by weight of magnesium silicate to said agitating solution thereby causing said suspended solids to flocculate, said magnesium silicate being amorphous and having a mole ratio ($SiO_2/MgO$) of 1.75/1.0 to 4.50/1.0, an average particle size of 10 to 50 microns, a surface area of 35 to 65% m$^2$/g, a bulk density of 0.40 to 0.75 g/cc, a weight loss of 105° C. of 5 to 15% and an ignition loss of 10 to 30%;
    (c) continuing the mixing for up to 20 minutes;
    (d) separating the flocculated solids from the supernatant; and
    (e) recovering the supernatant containing the chromium (III) ions.

10. The method of claim 9 wherein the separating step is accomplished by allowing the flocculated solids to settle.

11. The method of claim 9 wherein the separating step is accomplished by filtering or centrifuging.

12. The method of claim 9 wherein the mole ratio ($SiO_2/MqO$) is 1.75/1.0 to 3.25/1.0.

13. A method for flocculating suspended solids in acid medium, comprising the steps of:
    (a) agitating an aqueous solution containing suspended solids and having a pH between 2 and 4.5;
    (b) adding 0.1 to 0.35% by weight of magnesium silicate to said agitating solution thereby causing said suspended solids to flocculate, said magnesium silicate being amorphous, and having a mole ratio ($SiO_2/MgO$) of 1.75/1.0 to 4.50/1.0, an average particle size of 10 to 15 microns, a surface area of 35 to 65 m$^2$/g, a bulk density of 0.40 to 0.75 g/cc, a weight loss at 105° C. of 5 to 15% and an ignition loss of 10 to 30%;
    (c) continuing the mixing until flocculants form;
    (d) separating the flocculated solids from the supernatant; and
    (e) recovering the supernatant.

14. The method of claim 13 wherein the mole ratio ($MqO/SiO_2$) is 1.75/1.0 to 3.25/1.0.

* * * * *